United States Patent
Demchak et al.

(10) Patent No.: US 12,204,820 B2
(45) Date of Patent: Jan. 21, 2025

(54) METHOD AND APPARATUS FOR VISUALLY COMPARING GEO-SPATIALLY ALIGNED DIGITAL CONTENT ACCORDING TO TIME

(71) Applicant: Bentley Systems, Incorporated, Exton, PA (US)

(72) Inventors: Gregory Demchak, London (GB); Pascal Martinez, Paris (FR)

(73) Assignee: Bentley Systems, Incorporated, Exton, PA (US)

( * ) Notice: Subject to any disclaimer, the term of this patent is extended or adjusted under 35 U.S.C. 154(b) by 384 days.

(21) Appl. No.: 17/212,884

(22) Filed: Mar. 25, 2021

(65) Prior Publication Data
US 2022/0121784 A1   Apr. 21, 2022

(30) Foreign Application Priority Data
Oct. 20, 2020   (EP) ..................................... 20306249

(51) Int. Cl.
*G06F 30/13*   (2020.01)
*G06F 30/12*   (2020.01)

(52) U.S. Cl.
CPC .............. *G06F 30/13* (2020.01); *G06F 30/12* (2020.01)

(58) Field of Classification Search
CPC ........ G06F 30/13; G06F 30/12; G06F 3/0481; G06F 2111/02; G06F 2111/18; G06F 2203/04803
See application file for complete search history.

(56) References Cited

U.S. PATENT DOCUMENTS

| | | |
|---|---|---|
| 9,070,216 B2 | 6/2015 | Golparvar-Fard et al. |
| 9,852,238 B2 | 12/2017 | Forsyth et al. |
| 2005/0006595 A1 | 1/2005 | Goodwin et al. |

(Continued)

OTHER PUBLICATIONS

Schonfelder, Ralph, and Dieter Schmalstieg. "Augmented reality for industrial building acceptance." 2008 IEEE Virtual Reality Conference. IEEE, 2008. (Year: 2008).*

(Continued)

*Primary Examiner* — Nithya J. Moll
(74) *Attorney, Agent, or Firm* — Cesari and McKenna, LLP; James A. Blanchette

(57) ABSTRACT

In example embodiments, techniques are provided for visually comparing digital content for an infrastructure project according to time using 4-D construction modeling software. The 4-D construction modeling software includes a cloud-based 4-D comparison service and a local 4-D modeling client. The 4-D comparison service includes a digital content alignment service and a 4-D difference engine. The digital content alignment service aligns different pieces of digital content and produces views that provide visual comparison between different pieces of digital content. The 4-D difference engine automatically determines differences between different pieces of digital content. The 4-D modeling client includes a 4-D comparison user interface (UI) process that receives user input used to generate, and then displays a generated visual comparison between different pieces of digital content. The 4-D comparison UI utilizes time control channels for selecting digital content and comparison controls for selecting a type of visual comparison.

24 Claims, 6 Drawing Sheets

(56) References Cited

U.S. PATENT DOCUMENTS

| | | |
|---|---|---|
| 2006/0044307 A1 | 3/2006 | Song |
| 2010/0185976 A1* | 7/2010 | Sadanandan .......... G06F 3/0485 |
| | | 715/786 |
| 2013/0155058 A1 | 6/2013 | Golparvar-Fard et al. |
| 2017/0193331 A1 | 7/2017 | La Fleur et al. |
| 2018/0012125 A1 | 1/2018 | Ladha et al. |
| 2018/0349522 A1* | 12/2018 | Aphek .................... G06F 30/13 |
| 2019/0266653 A1 | 8/2019 | West et al. |
| 2021/0343032 A1* | 11/2021 | Hoiem ...................... G06T 3/20 |
| 2022/0198709 A1* | 6/2022 | Sudry .................... G06Q 50/08 |

OTHER PUBLICATIONS

"Integration Allowing BIM Model Comparison to the As-Built Record: Enhanced Project Management and Collaboration for the Constructions Industry," Lobster Pictures and Synchro Software Ltd, May 22, 2018, pp. 1-2.

"Lobster Pictures Case Study: World-Scale BIM Integration," Lobster Pictures, Jun. 18, 2020, pp. 1-11.

Zhao, Jane, "Using Juxtapose for Before/After Image Comparisons," Digital Media Commons, Jan. 24, 2017, pp. 1-3.

"European Search Report and Written Opinion," European Application No. 20 306 249.2-1224, Applicant: Bentley Systems, Incorporated, Date of Mailing: Apr. 13, 2021, pp. 1-17.

* cited by examiner

METHOD AND APPARATUS FOR VISUALLY COMPARING GEO-SPATIALLY ALIGNED DIGITAL CONTENT ACCORDING TO TIME

RELATED APPLICATIONS

The present application claims priority to EP Application No. 20306249.2, filed on Oct. 20, 2020 by Gregory Demchak et al., the contents of which are incorporated by reference herein in their entirety.

BACKGROUND

Technical Field

The present disclosure relates generally to digital construction management, and more specifically to techniques for visually comparing digital content for an infrastructure project according to time.

Background Information

Three-dimensional (3-D) computer aided design (CAD) models and four-dimensional (4-D) models play an increasingly important role in the design and construction of complex infrastructure (e.g., buildings, factories, roads, railways, bridges, electrical and communication networks, etc.). A 3-D CAD model (e.g., a 3-D building information model (BIM)) may represent infrastructure at a particular point in time. A 4-D model combines a 3-D CAD model (e.g., a 3-D BIM) with a project schedule (e.g., a Gantt chart) to create a digital representation of the state of an infrastructure project at multiple points in time. During the design phase, sequences of 3-D CAD models or a 4-D model may allow a user to visualize planned construction progress and develop optimal workflows. During the construction phase, sequences of 3-D CAD models or a 4-D model may allow a user to understand differences between planned construction progress and actual construction progress, to detect issues and dynamically respond.

In order to perform such role during the construction phase, it is necessary to capture information about actual construction progress. Some information may be captured by manual data entry. For example, a field worker may use a mobile application (app) to fill out forms to indicate status, issues, observations, submittals, inspections, etc. Some information may be captured using sensors. For example, a camera (e.g., a handheld digital camera, stationary panoramic or closed-circuit television (CCTV) camera, autonomous aerial vehicles (UAV)-mounted camera, etc.) may capture digital photographs. Likewise a laser scanner or survey instrument may capture point clouds or other data. In some cases, a photogrammetry application may be applied to digital photographs and/or point clouds to generate 3-D mesh models representative of the real-world (i.e. 3-D reality mesh models).

While field-captured digital content (a digital photograph, point cloud, or 3-D reality mesh model) may be easier to collect and more expressive than data from manual data entry, using it efficiently in the construction phase may present challenges. It is often difficult to compare field-captured digital content with modeled digital content (i.e. 3-D CAD models or a 4-D model). Further, it is often difficult to compare one piece of field-captured digital content to another. Typically, users must manually match digital content for the same point in time. Users then have to open the matched digital content, typically in separate software applications that support the given digital content type (e.g., a photo editor for a digital photograph, a CAD application for a 3-D CAD model, a 4-D modeling application for a 4-D model, etc.). The users often then attempt to manually adjust camera parameters to obtain approximately the same viewing angle. This sort of manual adjustment may be very time consuming as it sometimes is not early apparent how to align the digital content for comparison. Once this is complete, the users typically must gaze back and forth between these two separate software applications looking for differences. Due to the inefficient display, difference are often overlooked. Even if spotted, it is often difficult to quantify the differences.

Accordingly, there is a need for improved techniques for visually comparing digital content for an infrastructure project according to time.

SUMMARY

In example embodiments, techniques are provided for visually comparing digital content for an infrastructure project according to time using 4-D construction modeling software. The 4-D construction modeling software includes a cloud-based 4-D comparison service (among other cloud-based services) and a local 4-D modeling client. The 4-D comparison service includes a digital content alignment service and a 4-D difference engine. The digital content alignment service aligns different pieces of digital content and produces views that provide visual comparison between different pieces of digital content. The 4-D difference engine automatically determines differences between different pieces of digital content, including computing an intersection, identifying and quantify differences, and updating status of components. The 4-D modeling client includes a 4-D comparison user interface (UI) process that receives user input used to generate, and then displays a generated visual comparison between different pieces of digital content. The 4-D comparison UI utilizes time control channels for selecting digital content and comparison controls for selecting a type of visual comparison that makes differences readily apparent (e.g., a split view with a movable cutting plane, an overlay view with variable transparency or a side-by-side view).

In one example embodiment, a method is provided for visually comparing digital content for an infrastructure project according to time. 4-D construction modeling software executing on one or more computing devices receives a selection of a source and a time for a first time channel that defines first digital content for an infrastructure project. The 4-D construction modeling software also receives a selection of a source and a time for a second time channel that defines second digital content for the infrastructure project. It aligns the first digital content and the second digital content. It then generates a visual comparison between the first digital content and the second digital content, wherein the visual comparison includes a split view with a movable cutting plane, an overlay view with variable transparency or a side-by-side view, and displays the visual comparison in a UI.

In another example embodiment, a computing device having a processor and a memory is configured to compare digital content for an infrastructure project according to time. The memory stores a cloud-based 4-D comparison service of a 4-D construction monitoring application. The cloud-based 4-D comparison service includes a digital content alignment service configured to align first digital content for an infrastructure project corresponding to a first time channel and second digital content for the infrastructure project corresponding to a second time channel. The cloud-based 4-D comparison service also includes a 4-D difference engine configured to automatically compute differences between the first digital content and the second digital content. The digital content alignment service is further configured to provide a 4-D modeling client aligned views of the first digital content and the second digital content that include color or texture highlights indicating at least one component in the first digital content or the second digital content have a difference.

In still another example embodiment, a non-transitory electronic device readable medium includes instructions that when executed are operable to receive a selection of a source and a time for a first time channel that defines first digital content for an infrastructure project, wherein the first digital content is field-captured digital content, and receive a selection of a source and a time for a second time channel that defines second digital content for an infrastructure project, wherein the second digital content is modeled digital content. The instructions are further operable to align the first digital content and the second digital content. The instructions are also operable to generate a visual comparison between the first digital content and the second digital content, wherein the visual comparison indicates differences between planned construction progress and actual construction progress on the infrastructure project using a split view with a movable cutting plane, an overlay view with variable transparency or a side-by-side view, and to display the visual comparison in a UI.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Definitions

As used herein, the term "field-captured digital content" refers to a digital photograph, point cloud, or 3-D reality mesh model that has been captured from reality or generated from data captured from reality. The capture may be performed by a handheld digital camera, stationary panoramic or CCTV camera, UAV-mounted camera, laser scanner, survey instruments, etc. Field captured digital content may be associated with a particular point in time. In some cases, it may be geo-referenced to be associated with a particular capture viewpoint.

As used herein, the term "modeled digital content" refers to a 3-D CAD model (e.g., a 3-D BIM) or 4-D model (e.g., a 3-D BIM combined with a Gantt chart). Modeled digital content may be associated with one or more points in time (e.g., a 3-D CAD model may represent a particular point in time, while a 4-D may represent states at multiple points in time, etc.).

As used herein, the term "digital content" refers collective to both field-captured digital content and modeled digital content.

As used herein, the term "3-D reality mesh model" refers to a 3-D polygon mesh model that has been photogrammetry-generated from digital photographs and/or point clouds captured from the real-world. A 3-D reality mesh model may be based on digital photographs and/or point clouds captured at a particular point in time, and thereby represent such point in time.

As used herein, the term "three-dimensional computer aided design model" or "3-D CAD model" refers to a 3-D model that has been generated in computer aided design (CAD) software by one or more users. A 3-D CAD model may represent a particular point in time. Sequences of 3-D CAD models may represent states at multiple points in time.

As used herein, the term "four-dimensional model" or "4-D model" refers to a 3-D CAD model (e.g., a 3-D BIM) combined with a project schedule (e.g., a Gantt chart). A 4-D model may represent states at multiple points in time.

Example Embodiments

Figure 1:
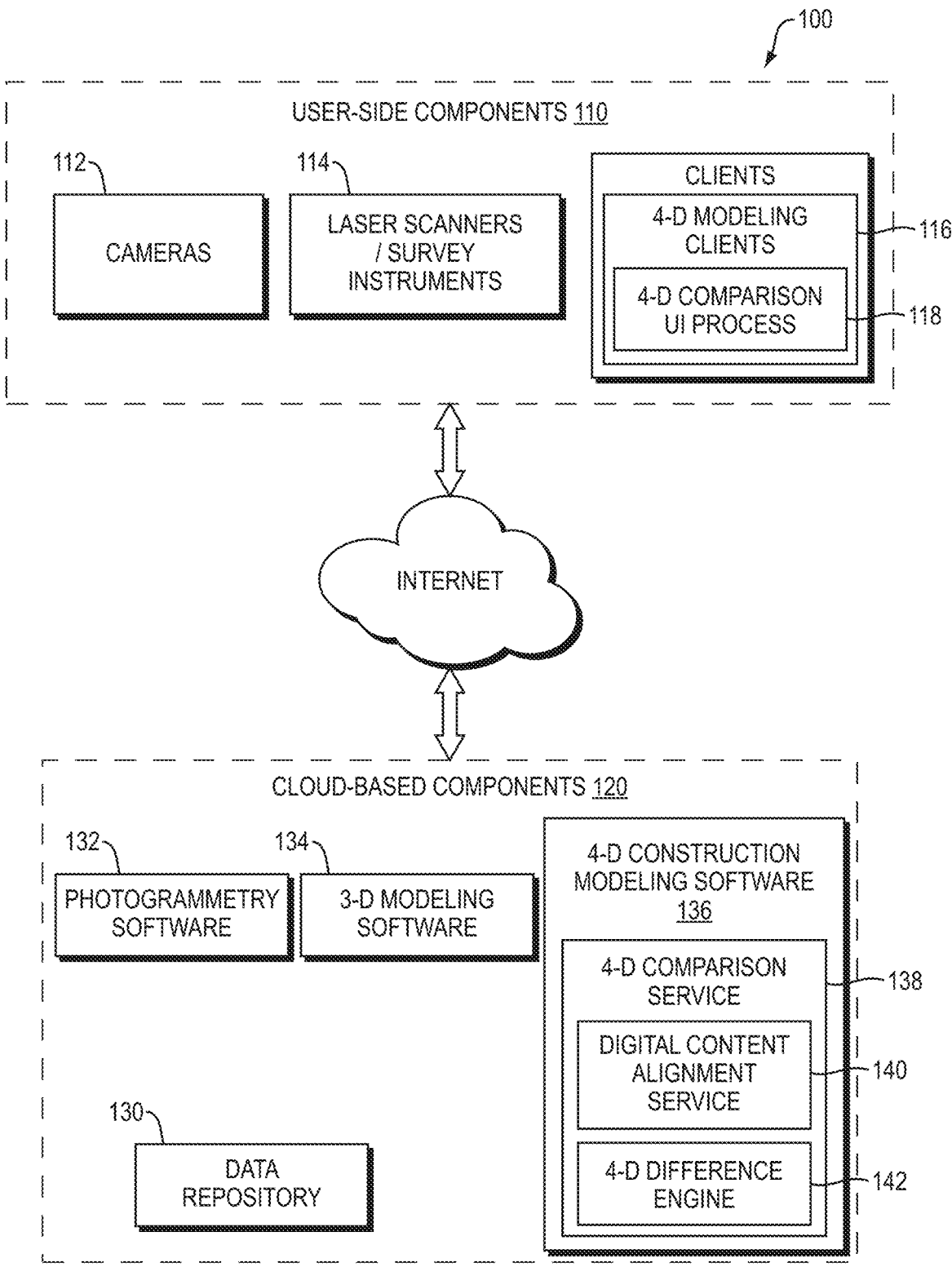
FIG. 1 is a high-level block diagram of an example architecture that includes a 4-D comparison service.

FIG. 1 is a high-level block diagram of an example architecture 100 that includes a 4-D comparison service. The architecture may be divided into user-side components 110 arranged locally to a user and cloud-based components 120 arranged on one or more remote computing devices ("cloud computing devices") accessible over the Internet. The user-side components 110 include cameras 112 (e.g., handheld digital cameras, stationary panoramic or CCTV cameras, UAV-mounted cameras, etc.) that capture digital photographs (e.g., time-stamped, geo-referenced digital photographs) of an infrastructure project, scanners and survey instruments 114 that capture point clouds (e.g., time-stamped point clouds) of an infrastructure project, and/or other types of devices that capture digital content.

The user side components also include a variety of client applications (or simply "clients") executing on local computing devices. The clients may be of various types, including desktop clients (i.e. clients that operate directly under an operating system of a computing device), web clients (i.e. clients that operate within a web browser of a computing device), mobile clients (i.e. clients specially adapted to execute under a mobile operating system of a mobile device), etc. The clients may be concerned mainly with providing user interfaces and other non-processing intensive operations. The clients may include photogrammetry clients, 3-D modeling clients, and 4-D modeling clients 116 (e.g., a 4-D modeling web client). At least some 4-D modeling clients 116 include a 4-D comparison UI process 118 that receives user input used to generate, and then displays a generated visual comparison between, different pieces of digital content.

The cloud-based components 120 include cloud-based application software 132-136 and a data repository 130. The application software 132-136 may handle more processing intensive operations, producing output that is used by other application software or consumed by the clients. Photogrammetry software 132 takes digital photographs and/or point clouds and generates 3-D reality mesh models of infrastructure projects. Such operation may be divided into two distinct stages: an automatic structure-from-motion (SfM) stage and a dense 3-D reconstruction stage. The automatic SfM stage typically involves SfM techniques that compute camera parameters of each of the images and generate a low-density (i.e. sparse) 3-D point cloud. The 3-D reconstruction stage typically involves a dense 3-D reconstruction that produces a 3-D mesh the sparse 3-D point cloud and camera parameters and applies textures to the 3-D mesh to produce the completed 3-D reality mesh model. A number of 3-D reality mesh models may be generated using digital photographs and/or point clouds from different points in time to represent actual construction progress on an infrastructure project. 3-D modeling software 134 produce 3-D CAD models (e.g., 3-D BIMs) for infrastructure projects. A 3-D CAD model may utilize a built infrastructure schema (BIS) which describe infrastructures using elements, models, and relationships. Elements represent (i.e. "model", in a colloquial sense of the term) individual entities. A model acts as a container for a set of elements where the set of elements collectively represent (i.e. "model", in a colloquial sense of the term) an entity. Models may be arranged according to a model hierarch. Relationships relate two or more elements or models. Examples of relationships include parent-child relationships that may imply ownership and peer-peer relationships that may define groups. A sequence of 3-D CAD models (e.g., revisions) may be generated for various points in time to represent planned construction progress on an infrastructure project.

4-D construction modeling software 136 combines 3-D CAD models generated by the 3-D modeling software 134 with project schedules (e.g., Gantt charts) to create 4-D models of infrastructure projects. The 4-D construction modeling software 136 may provide virtual construction simulation functionality, work package creation and management functionality, project progress tracking functionality, look-ahead planning functionality, as well as a wide variety of there functionality for digital construction management. As part of its functionality, the 4-D construction modeling software includes a 4-D comparison service 138 that works with the 4-D comparison UI process 118 of the 4-D modeling clients 116 to provide a visual comparison of digital content according to time. The 4-D comparison service 138 includes a digital content alignment service 140 that aligns different pieces of digital content and produces views that provide visual comparison between different pieces of digital content. The 4-D comparison service 138 also includes 4-D difference engine 142 that automatically determines differences between different pieces of digital content, including computing an intersection, identifying and quantify differences, and updating status of components.

The data repository 130 acts as a central repository for storing digital content. Different portions of the data repository 130 may store field-captured digital content, such as digital photographs, point clouds, and 3-D reality mesh models, and modeled digital content, such as 3-D CAD models or a 4-D model.

Figure 2:
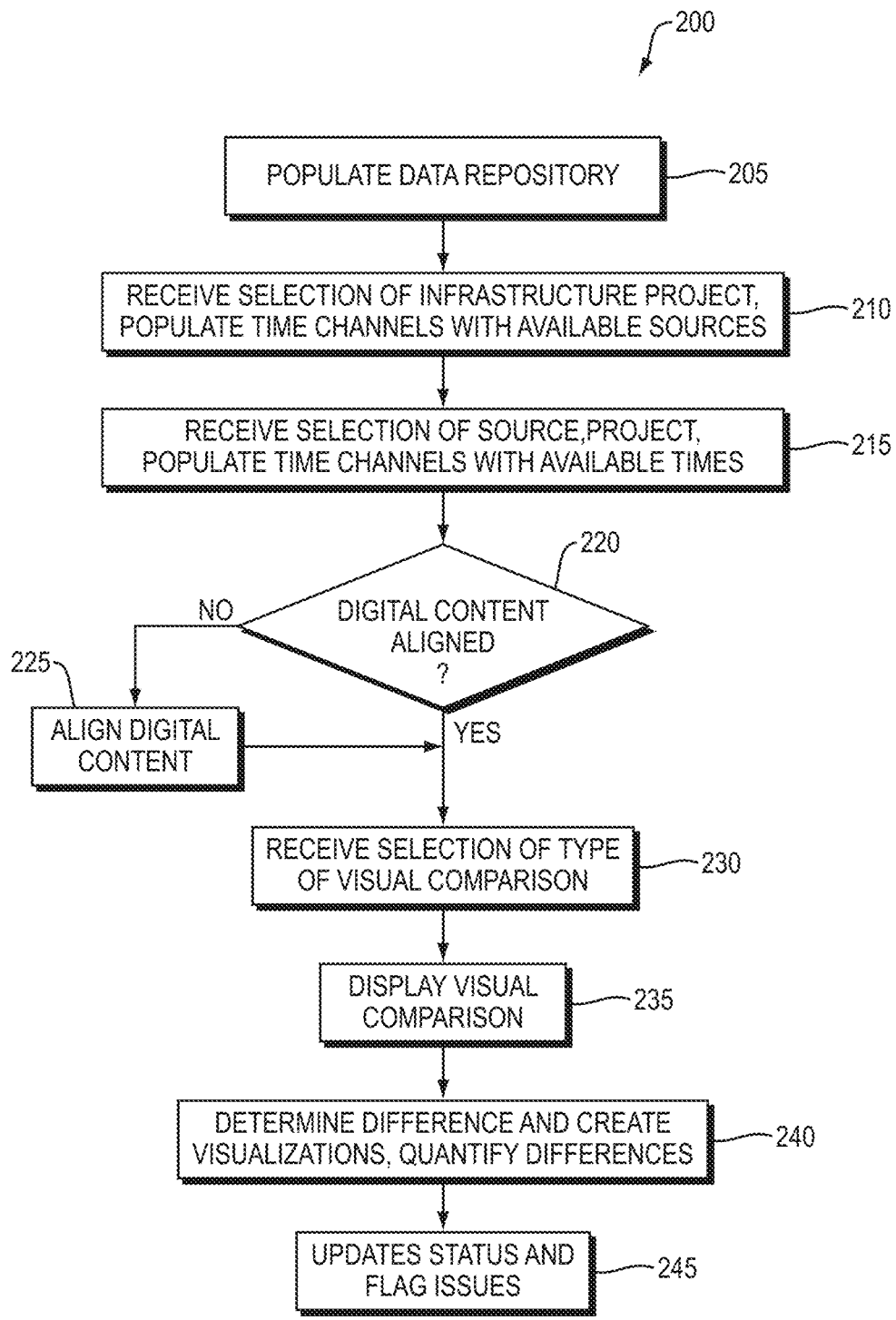
FIG. 2 is a high-level flow diagram of a sequence of steps that may be executed by the 4-D comparison service and the 4-D comparison UI process to visually compare digital content for an infrastructure project according to time.
Figure 3A:
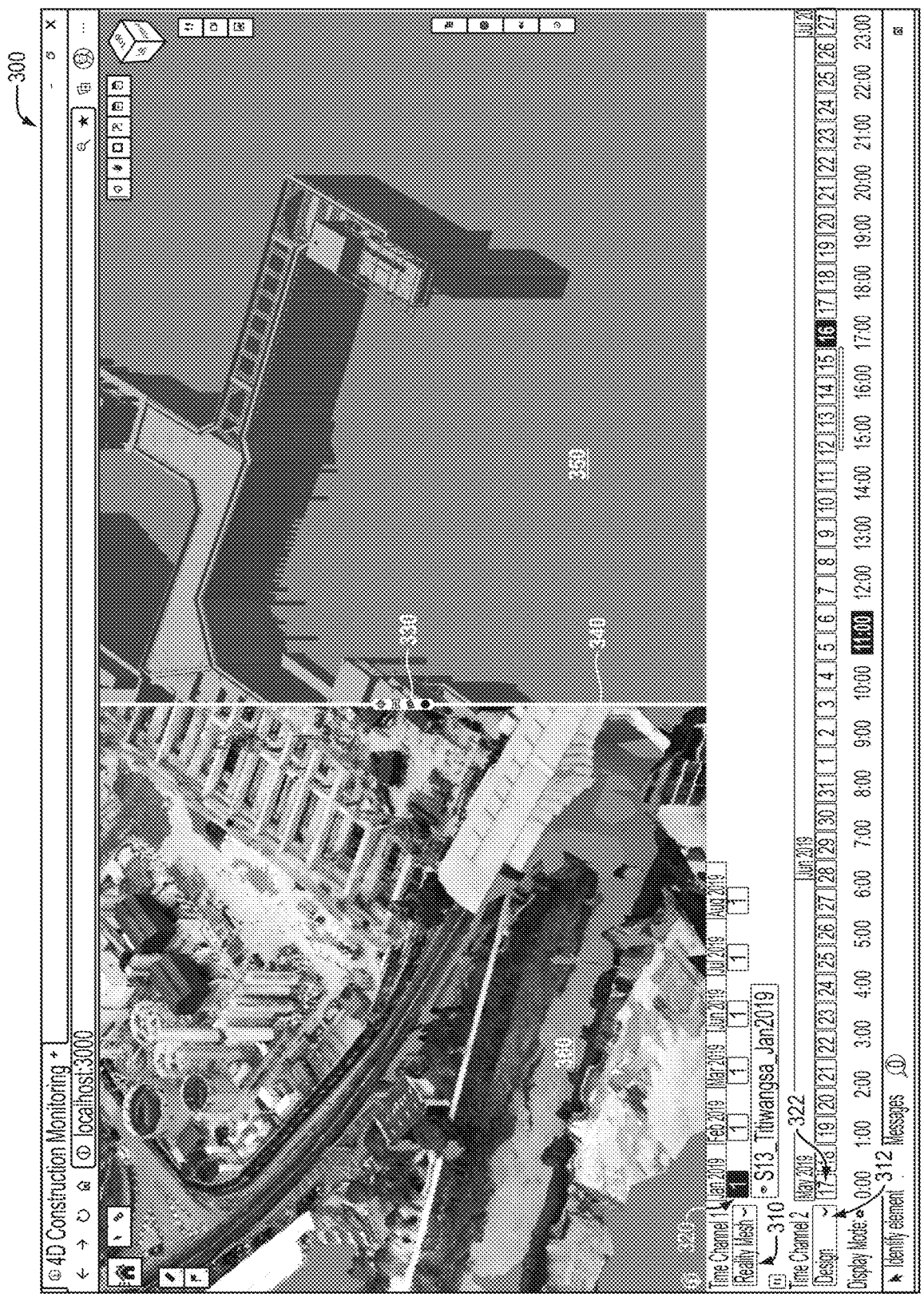
FIGS. 3A-C are screen shots of an example 4-D comparison UI that may assist in understanding some of the steps of FIG. 2.
Figure 3B:
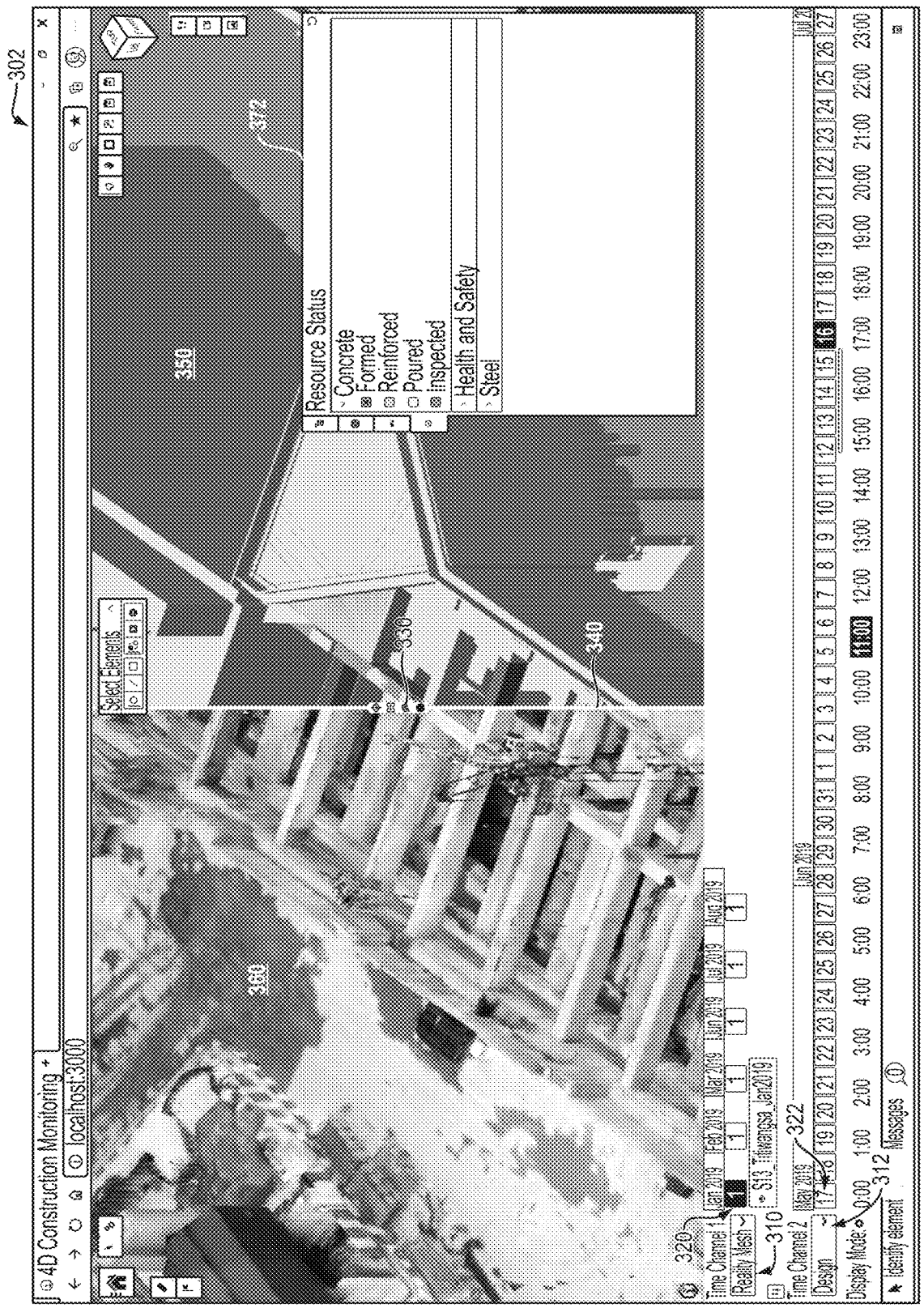
Figure 3C:
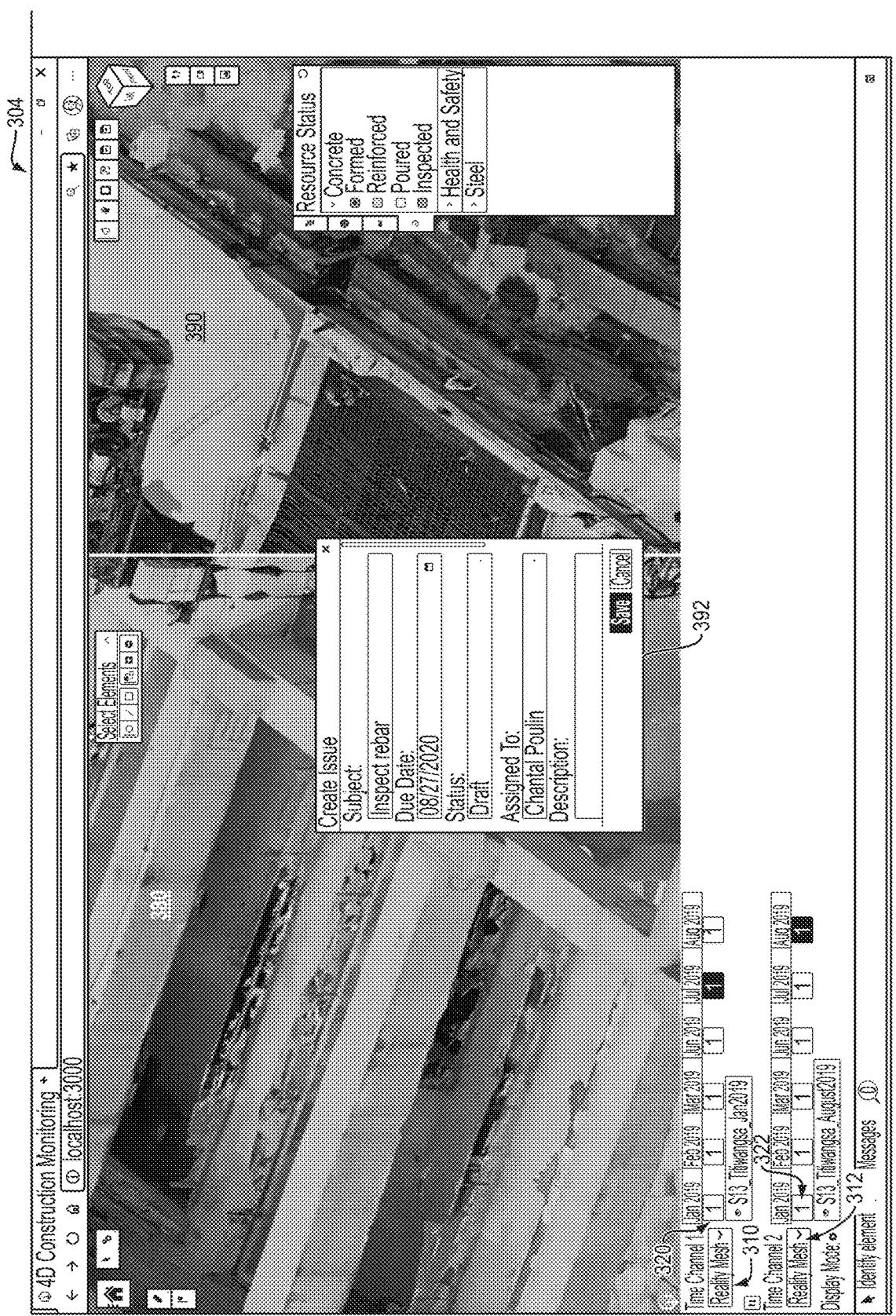

FIG. 2 is a high-level flow diagram of a sequence of steps 200 that may be executed by the 4-D comparison service 138 and the 4-D comparison UI process 118 to visually compare digital content for an infrastructure project according to time. FIGS. 3A-C are screen shots 300-304 of an example 4-D comparison UI that may assist in understanding some of the steps 200 of FIG. 2.

At step 205, the 4-D comparison service 138 populates the data repository 130 with digital content based on external inputs (e.g., from photogrammetry software 132, 3-modeling software 134 or 4-D construction modeling software 136).

At step 210, the 4-D comparison UI process 118 receives a selection of an infrastructure project from a user. As part of step 210, the 4-D comparison UI process 118 may populate source menus of time channels based on the available digital content for the infrastructure project in the data repository 130. Referring to FIG. 3A, in this example the 4-D comparison UI process 118 populates source menus 310, 312 for "Time Channel 1" and "Time Channel 2".

At step 215, the 4-D comparison UI process 118 receives a selection of a source for each time channel in the respective source menu. The source may be field-captured digital content, such as digital photographs, point clouds or 3-D reality mesh models, or modeled digital content, such as 3-D CAD models or a 4-D model. As part of step 215, the comparison UI 118 may populate time menus of the time channels based on content available for the infrastructure project from the respective source in the data repository 130. Referring to FIG. 3A, in this example, a selection of 3-D reality mesh models is received for "Time Channel 1" and a selection of 3-D CAD models is received for "Time Channel 2". A time menu 320 of "Time Channel 1" is populated with times of "Jul. 1, 2019", "Feb. 1, 2019", "Mar. 1, 2010", etc. indicating a 3-D reality mesh model is available for each of those times. A time menu 322 of "Time Channel 2" is populated with times of "May 17, 2019", "May 18, 2019", "May 19, 2010", etc. indicating a 3-D CAD model is available for each of those times.

At step 220, the 4-D comparison UI process 118 determines whether digital content of the first time channel is aligned with digital content of the second time channel (i.e. they share the same view position, view orientation and scale). If they are not aligned, execution proceeds to step 225, where the digital content of the first time channel is aligned with the digital content of the second time channel by the digital content alignment service 140 of the 4-D comparison service 138 and aligned views of the first digital content and the second digital content are provided back to the 4-D comparison UI process 118. Details of such operation are discussed below in reference to FIG. 4. If they are aligned, execution proceeds to step 230.

At step 230, the 4-D comparison UI process 118 receives a selection of a type of visual comparison between the digital content of the first time channel and the digital content of the second time channel. The type of visual comparison may be a split view with a movable cutting plane. In such a view, the digital content of the first time channel and the digital content of the second time channel are both sized to fill an entire display area, and a determination of which to show is based on the position of the movable cutting plane (e.g., the digital content of the first time channel is shown on one side, and the digital content of the second time channel is shown on the other). Moving the cutting plane causes more or less of the digital content from one time channel to be shown (while the amount of digital content of the other time channel is inversely effected). Alternatively, the type of visual comparison may be an overlay view with variable transparency. In such a view the digital content of the first time channel and the digital content of the second time channel are both sized to fill an entire display area, a determination of how much of each to show is based on the position of a movable transparency slider (e.g., only digital content of the first time channel is shown at one extreme of the transparency slider, and only digital content of the second time channel is shown at the other extreme of the transparency slider). Moving the transparency slider causes digital content from one time channel to be shown more or less transparently (obscuring digital content of the other time channel or allowing it to show through more clearly in an inverse relationship). In another alternative, the type of visual comparison may be a side-by-side comparison. In such a view, the digital content of the first time channel may be sized to fill a first half of the display area and the digital content of the second time channel may be sized to file a second half of the display area. It should be understood that while the term "side-by-side" is used, the two halves of the display area need not be horizontally disposed. In some cases, one half may be disposed above the other half, in a vertical arrangement. Referring to FIG. 3A, in this example, the selection of the type of visual comparison is of a split view with a movable cutting plane. The selection is made using visual comparison menu 330, which is part of splitting plane/transparency slider 340.

At step 235, the 4-D comparison UI process 118 displays the visual comparison. Referring to FIG. 3A, in this example, the 3-D CAD model 350 for "Jun. 16, 2019" is displayed to the right of the splitting plane 340 and the 3-D reality mesh 360 for "Jan. 1, 2019" is displayed to the left of the splitting plane 340. The 3-D CAD model 350 may show planned construction progress while the 3-D reality mesh 360 may show actual construction progress, such that the visual comparison indicates differences between planned construction progress and actual construction progress.

At step 240, differences are determined between the digital content of the first time channel and the digital content of the second time channel. In some cases, differences may be manually determined by a user observing the displayed visual comparison. Visualizations may be manually created by a user interacting with the 4-D comparison UI process 118 to add an indication of a difference to the digital content of the first time channel and/or the digital content of the second time channel. The indication may include a color or texture highlight other graphical or textual indication. In other cases, difference may be computed automatically and visualizations added automatically by the 4-D difference engine 142 of the 4-D comparison service 138. The 4-D difference engine 142 may compute differences by building 3D volumes in the digital content of the first time channel and the digital content of the second time channel, and then calculating intersections of 3-D volumes. When 3-D volumes substantially fully overlap, the digital content of the first time channel and the digital content of the second time channel may be considered substantially the same. When 3-D volumes do not substantially fully overlap, the digital content of the first time channel and the digital content of the second time channel may be considered different. As part of step 340, the 4-D comparison service 138 may quantify differences, for example, in terms of differing volume, area, length or count. The 4-D difference engine 142 may base the quantification on the respective 3-D volumes, comparing measurements thereof, number thereof, etc.

At step 245, status of components is updated and issues flagged in the digital content of the first time channel and/or the digital content of the second time channel. In some cases, status of components may be updated and issued issues flagged manually by a user observing the displayed visual comparison, and then interacting with the 4-D comparison UI process 118 to change component status or create issue flags. In other cases, status of components may be updated and issues flagged automatically by the 4-D difference engine 142. For example, status may be determined, at least in part, based on the calculated intersections of 3-D volumes in the digital content of the first time channel and the digital content of the second time channel. A greater overlap of 3-D volumes may indicate a more complete status, while a lesser overlap may indicate a less complete status. Issues may be determined bases on predefined rules, machine learning, and/or other techniques.

Referring to FIG. 3C, in a different example where the time channels show two different 3-D reality mesh models 380, 390, the user interacts with a "Create issues" menu 392 to create an issue of "Inspect rebar" for a component.

Figure 4:
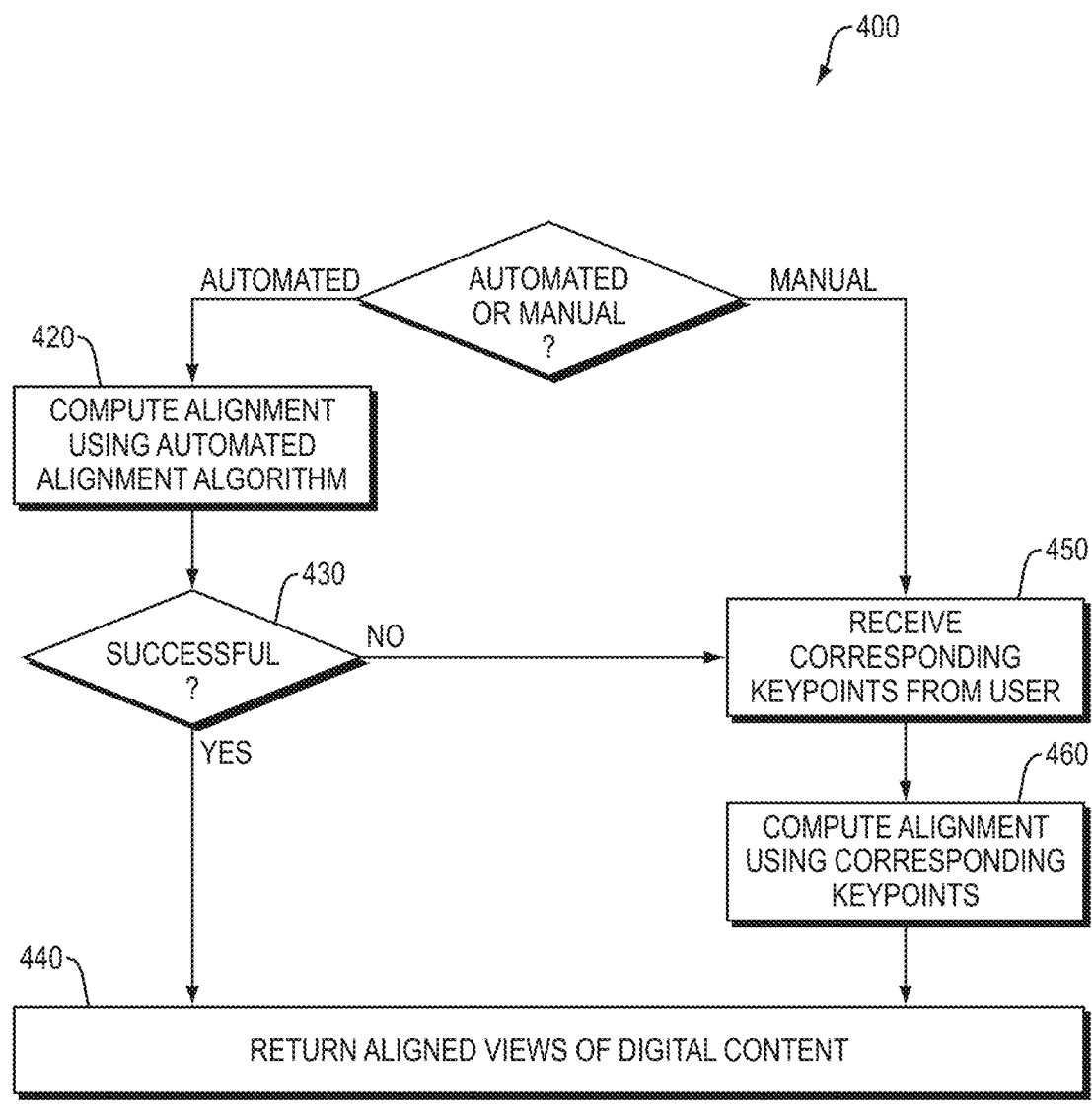
FIG. 4 is a flow diagram of an example sequence of steps that may be executed by the digital content alignment service of the 4-D comparison service to align first digital content and second digital content.

FIG. 4 is a flow diagram of an example sequence of steps 400 that may be executed by the digital content alignment service 140 of the 4-D comparison service 138 to align first digital content and the second digital content. At step 410, the digital content alignment service 140 determines whether a manual or automated alignment is be performed, for example, based on user input received by the 4-D comparison UI process 118. If a manual alignment is chosen to be performed, then execution proceeds to step 450. If an automated alignment is chosen to be performed, then execution proceeds to step 420.

At step 420, the digital content alignment service 140 computes an alignment with an automated alignment algorithm absent manual selections, so that components in at least a local area of the first digital content and the second digital content coincide. The automated alignment algorithm may be an Iterative Closest Point algorithm, Coherent Point Drift (CPD), a Sorting the Correspondence Space (SCS) algorithm, or another algorithm. At step 430, the digital content alignment service 140 determines whether the automated alignment algorithm was successful (e.g., based upon output from the algorithm). If so, at step 440 the digital content alignment service 140 returns aligned views of the first digital content and the second digital content to the 4-D comparison UI process 118. If not, execution proceeds to step 450, where a manual alignment is initiated.

At step 450, the digital content alignment service 140 causes the 4-D comparison UI process 118 to prompt the user to select corresponding keypoints (e.g., 3 corresponding keypoints) in the first digital content and the second digital content. At step 460, the digital content alignment service 140 applies a feature-based alignment algorithm to the corresponding keypoints to calculate a transform that explains the correspondences, up to some tolerance. The select corresponding keypoints and the transform may be stored in the data repository 130. Then, after applying the transform, at step 440, the digital content alignment service 140 returns aligned views of the first digital content and the second digital content to the 4-D comparison UI process 118.

In summary, techniques are provided for visually comparing digital content for an infrastructure project according to time using 4-D construction modeling software. It should be understood that a wide variety of adaptations and modifications may be made to the techniques. Further, in general, functionality may be implemented using different software, hardware and various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for visually comparing digital content for an infrastructure project according to time, comprising:
receiving, from a user by four-dimension (4-D) construction modeling software executing on one or more computing devices, a selection in a user-interface (UI) of a first source;
populating, by the 4-D construction modeling software, a first time channel in the UI with a plurality of times for which content is available from the first source;
receiving, from the user by the 4-D construction modeling software, a selection in the UI of a first time from the first time channel, wherein the first source and the first time defines first digital content for the infrastructure project, wherein the first digital content is field-captured digital content;
receiving, from the user by the 4-D construction modeling software, a selection in the UI of a second source;
populating, by the 4-D construction modeling software, a second time channel in the UI with a plurality of times for which content is available from the second source;
receiving, from the user by the 4-D construction modeling software, a selection in the UI of a second time from the second time channel, wherein the second source and the second time defines second digital content for the infrastructure project, wherein the second digital content is modeled digital content, and the selected time for the second time channel is different than the selected time for the first time channel;
aligning the first digital content and the second digital content;
generating, by the 4-D construction modeling software, a visual comparison between the first digital content and the second digital content, wherein the visual comparison includes a split view with a movable cutting plane that controls where in a display area the first digital content or the second digital content is shown; and
displaying the visual comparison in the UI.

2. The method of claim 1, wherein the visual comparison indicates differences between planned construction progress and actual construction progress on the infrastructure project.

3. The method of claim 1, wherein the field-captured digital content is a three-dimensional (3-D) reality mesh model and the modeled digital content is a 3-D computer aided design (CAD) model or 4-D model.

4. The method of claim 1, wherein the field-captured digital content is a digital photograph and the modeled digital content is a three-dimensional (3-D) computer aided design (CAD) model or 4-D model.

5. The method of claim 1, further comprising:
automatically computing, by the 4-D construction monitoring software, differences between the first digital content and the second digital content; and
visualizing the computed differences in the visual comparison, wherein the visualizing includes changing a color or texture of at least one component in the first digital content or the second digital content.

6. The method of claim 5, further comprising automatically updating a status of at least one component in the first digital content or the second digital content.

7. The method of claim 1, further comprising:
automatically quantifying, by the 4-D construction monitoring software, differences between the first digital content and the second digital content; and
displaying the quantification of differences in the visual comparison, wherein the quantification includes at least one of a differing volume, area, length or count between one or more components in the first digital content and one or more corresponding components in the second digital content.

8. The method of claim 1, wherein the first source and the second source are a data repository.

9. The method of claim 1, wherein the aligning is performed based on manually selected corresponding keypoints in the first digital content and in the second digital content.

10. The method of claim 1, wherein the aligning is performed based on an automated alignment.

11. The method of claim 1, wherein the 4-D construction monitoring software comprises a cloud based 4-D comparison service and a local 4-D modeling client.

12. A computing device configured to compare digital content for an infrastructure project according to time, comprising:
a processor; and
a memory coupled to the processor and configured to store a cloud-based four-dimensional (4-D) comparison service of a 4-D construction monitoring application that includes:
a digital content alignment service configured to
receive from a user a selection in a user-interface (UI) of a first source,
populate a first time channel in the UI with a plurality of times for which content is available from the first source,
receive a selection in the UI of a first time from the first time channel, wherein the first source and the first time defines first digital content for the infrastructure project, wherein the first digital content is field-captured digital content,
receive from the user a selection in the UI of a second source,
populate a second time channel in the UI with a plurality of times for which content is available from the second source,
receive a selection in the UI of a second time from the second time channel, wherein the second source and the second time defines second digital content for the infrastructure project, wherein the second digital content is modeled digital content, and the selected time for the second time channel is different than the selected time for the first time channel, and
align the first digital content and second digital content, and
a 4-D difference engine configured to automatically compute differences between the first digital content and the second digital content,
wherein the digital content alignment service is further configured to provide a 4-D modeling client aligned views of the first digital content and the second digital content that include color or texture highlights indicating at least one component in the first digital content or the second digital content have a difference.

13. The computing device of claim 12, wherein the visual comparison indicates differences between planned construction progress and actual construction progress on the infrastructure project.

14. The computing device of claim 12, wherein the field-captured digital content is a 3-D reality mesh model and the modeled digital content is a three-dimensional (3-D) computer aided design (CAD) model or 4-D model.

15. A non-transitory electronic device readable medium having instructions that when executed on one or more processors of one or more electronic devices are operable to:
receive a selection from a user in a user-interface (UI) of a first source;
populate a first time channel in the UI with a plurality of times for which content is available from the first source,
receive a selection from the user in the UI of a first time from the first time channel, wherein the first source and the first time defines first digital content for an infrastructure project, wherein the first digital content is field-captured digital content;
receive a selection from the user in the UI of a second source;
populate a second time channel in the UI with a plurality of times for which content is available from the second source;
receive a selection from the user in the UI of a second time from the second time channel, wherein the second source and the second time defines second digital content for the infrastructure project, wherein the second digital content is modeled digital content and the selected time for the second time channel is different than the selected time for the first time channel;
align the first digital content and the second digital content;
generate a visual comparison between the first digital content and the second digital content, wherein the visual comparison indicates differences between planned construction progress and actual construction progress on the infrastructure project using a split view with a movable cutting plane that controls where in a display area the first digital content or the second digital content is shown; and
display the visual comparison in the UI.

16. The non-transitory electronic device readable medium of claim 15, wherein the field-captured digital content is a three-dimensional (3-D) reality mesh model and the modeled digital content is a 3-D computer aided design (CAD) model or 4-D model.

17. The non-transitory electronic device readable medium of claim 15, wherein the field-captured digital content is a digital photograph and the modeled digital content is a three-dimensional (3-D) computer aided design (CAD) model or 4-D model.

18. The non-transitory electronic device readable medium of claim 15, further comprising instructions that when executed are operable to:
automatically compute differences between the first digital content and the second digital content; and
visualize the computed differences in the visual comparison, wherein the visualization includes changing a color or texture of at least one component in the first digital content or the second digital content.

19. The non-transitory electronic device readable medium of claim 15, further comprising instructions that when executed are operable to:
automatically quantify differences between the first digital content and the second digital content; and
display the quantification of difference in the visual comparison, wherein the quantification includes at least one of a differing volume, area, length or count between one or more components in the first digital content and one or more corresponding components in the second digital content.

20. A method for visually comparing digital content for an infrastructure project according to time, comprising:
receiving, by four-dimension (4-D) construction modeling software executing on one or more computing devices, a selection from a user in a user interface (UI) of a first source that includes a plurality of three-dimensional (3-D) reality mesh models;
populating, by the 4-D construction modeling software, a first time menu of the UI with a plurality of times for which 3-D reality mesh models are available from the first source;
receiving, by the 4-D construction modeling software, a selection from the user of a first time from the plurality of times of the first time menu, wherein the first source and first time defines first digital content for the infrastructure project from a 3-D reality mesh model of the plurality of 3-D reality mesh models;
receiving, by the 4-D construction modeling software, a selection from the user in the UI of a second source that includes a plurality of 3-D computer aided design (CAD) models;
populating, by the 4-D construction modeling software, a second time menu of the UI with a plurality of times for which 3-D CAD models are available from the second source;
receiving, by the 4-D construction modeling software, a selection from the user of a second time from the plurality of times of the second time menu, wherein the second source and second time defines second digital content for the infrastructure project from a 3-D CAD model of the plurality of 3-D CAD models;
aligning the first digital content and the second digital content;
automatically computing, by the 4-D construction monitoring software, differences between the first digital content and the second digital content;
generating a visualization of the computed differences; and
displaying the visualization of the computed differences in the UI.

21. The method of claim 20, wherein the first time and the second time are different times.

22. The method of claim 20, further comprising:
determining, by the 4-D construction monitoring software, for one or more of the computed differences a quantification of difference in volume, area, length or count between one or more components in the first digital content and one or more corresponding components in the second digital content; and
display the quantification of difference in the UI.

23. A method for visually comparing digital content for an infrastructure project according to time, comprising:
receiving, by four-dimension (4-D) construction modeling software executing on one or more computing devices, a selection from a user in a user interface (UI)

of a first source that includes a plurality of three-dimensional (3-D) reality mesh models;

populating, by the 4-D construction modeling software, a first time menu of the UI with a plurality of times for which 3-D reality mesh models are available from the first source;

receiving, by the 4-D construction modeling software, a selection from the user of a first time from the plurality of times of the first time menu, wherein the first source and first time defines first digital content for the infrastructure project from a first 3-D reality mesh model of the plurality of 3-D reality mesh models;

receiving, by the 4-D construction modeling software, a selection from the user in the UI of a second source that includes the plurality of 3-D reality mesh models;

populating, by the 4-D construction modeling software, a second time menu of the UI with a plurality of times for which 3-D reality mesh models are available from the second source;

receiving, by the 4-D construction modeling software, a selection from the user of a second time from the plurality of times of the second time menu, wherein the second time is different from the first time, and the second source and second time defines second digital content for the infrastructure project from a second 3-D reality mesh model of the plurality of 3-D reality mesh models;

aligning the first digital content and the second digital content;

automatically computing, by the 4-D construction monitoring software, differences between the first digital content and the second digital content;

generating a visualization of the computed differences; and displaying the visualization of the computed differences in the UI.

24. The method of claim 23, further comprising:

determining, by the 4-D construction monitoring software, for one or more of the computed differences a quantification of difference in volume, area, length or count between one or more components in the first digital content and one or more corresponding components in the second digital content; and display the quantification of difference in the UI.

* * * * *

UNITED STATES PATENT AND TRADEMARK OFFICE
CERTIFICATE OF CORRECTION

PATENT NO. : 12,204,820 B2
APPLICATION NO. : 17/212884
DATED : January 21, 2025
INVENTOR(S) : Gregory Demchak et al.

It is certified that error appears in the above-identified patent and that said Letters Patent is hereby corrected as shown below:

In the Specification

Column 6, Line 6 reads:
"inputs (e.g., from photogrammetry software 132, 3-model-"
Should read:
--inputs (e.g., from photogrammetry software 132, 3-D model- --

Column 6, Lines 30-31 reads:
"populated with times of "Jul. 1, 2019", "Feb. 1, 2019", "Mar. 1, 2010", etc. indicating a 3-D reality mesh model is"
Should read:
--populated with times of "July 1 2019", "Feb 1 2019", "Mar 1 2010", etc. indicating a 3-D reality mesh model is--

Column 6, Lines 33-34 reads:
"Channel 2" is populated with times of "May 17, 2019", "May 18, 2019", "May 19, 2010", etc. indicating a 3-D CAD"
Should read:
--Channel 2" is populated with times of "May 17 2019", "May 18 2019", "May 19 2010", etc. indicating a 3-D CAD--

Column 7, Line 26 reads:
"example, the 3-D CAD model 350 for "Jun. 16, 2019" is"
Should read:
--example, the 3-D CAD model 350 for "June 16 2019" is--

Column 7, Line 28 reads:
"reality mesh 360 for "Jan. 1, 2019" is displayed to the left"
Should read:
--reality mesh 360 for "Jan 1 2019" is displayed to the left--

Signed and Sealed this
Fourth Day of March, 2025

Coke Morgan Stewart
*Acting Director of the United States Patent and Trademark Office*